US011733949B2

(12) United States Patent
Yamada

(10) Patent No.: US 11,733,949 B2
(45) Date of Patent: Aug. 22, 2023

(54) PRINTING SYSTEM CONFIGURED TO COLLECT PRINT LOG OF PRINTER, MANAGEMENT DEVICE THEREFOR, AND NON-TRANSITORY COMPUTER-READABLE RECORDING MEDIUM FOR MANAGEMENT DEVICE

(71) Applicant: Brother Kogyo Kabushiki Kaisha, Nagoya (JP)

(72) Inventor: Jun Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/456,684

(22) Filed: Nov. 29, 2021

(65) Prior Publication Data
US 2022/0083296 A1   Mar. 17, 2022

Related U.S. Application Data

(63) Continuation of application No. PCT/JP2020/012982, filed on Mar. 24, 2020.

(30) Foreign Application Priority Data

May 31, 2019   (JP) ................................ 2019-102406

(51) Int. Cl.
    *G06F 3/12*   (2006.01)
(52) U.S. Cl.
    CPC .......... *G06F 3/1273* (2013.01); *G06F 3/1204* (2013.01); *G06F 3/1229* (2013.01)

(58) Field of Classification Search
    CPC .... G06F 3/1273; G06F 3/1204; G06F 3/1229; G06F 3/122; B41J 29/38; H04N 1/00
    (Continued)

(56) References Cited

U.S. PATENT DOCUMENTS

| 2003/0195917 A1 | 10/2003 | Horiyama et al. |
| 2004/0158661 A1 | 8/2004 | Mokuya |

(Continued)

FOREIGN PATENT DOCUMENTS

| JP | 2000-347827 A | 12/2000 |
| JP | 2002-041274 A | 2/2002 |

(Continued)

OTHER PUBLICATIONS

International Search Report (with English translation) and Written Opinion, International Application No. PCT/JP2020/012982, dated Jun. 16, 2020 (13 pages).

(Continued)

*Primary Examiner* — Miya J Williams
*Assistant Examiner* — Pawan Dhingra
(74) *Attorney, Agent, or Firm* — Burr Patent Law, PLLC

(57) ABSTRACT

A management device is configured to perform collecting a plurality of print logs respectively generated by a plurality of printers. Each of the plurality of print logs contains print amount information and first category information indicating a category of the print amount information, The management device is further configured to identify a category represented by the first category information by referring to a first database, extracting the print amount information from the plurality of print logs collected in the collecting, and generate output data based on the print amount information to output the same.

19 Claims, 13 Drawing Sheets

(58) Field of Classification Search
USPC .............................. 358/1.15, 1.14, 1.13, 1.1
See application file for complete search history.

(56) References Cited

U.S. PATENT DOCUMENTS

| | | | | |
|---|---|---|---|---|
| 2005/0243366 | A1* | 11/2005 | Fukuda | G06Q 10/06 |
| | | | | 358/1.15 |
| 2014/0067456 | A1 | 3/2014 | Kashida | |
| 2018/0293033 | A1* | 10/2018 | Yamaguchi | G06F 3/1218 |

FOREIGN PATENT DOCUMENTS

| | | | |
|---|---|---|---|
| JP | 2003-308192 | A | 10/2003 |
| JP | 2004-192347 | A | 7/2004 |
| JP | 2005-250533 | A | 9/2005 |
| JP | 2005-266120 | A | 9/2005 |
| JP | 2006-004165 | A | 1/2006 |
| JP | 2007-304868 | A | 11/2007 |
| JP | 2013-137594 | A | 7/2013 |
| JP | 2014-049059 | A | 3/2014 |
| JP | 2015-184835 | A | 10/2015 |

OTHER PUBLICATIONS

English translation of International Preliminary Report on Patentability (Chapter I) (Appl. No. PCT/JP2020/012982) 16 pages, dated Dec. 9, 2021.
Japanese Office Action (Application No. 2019-102406) dated Jun. 6, 2023 (with English translation) (11 pages).

* cited by examiner

| USER ID | USER NAME | SUPPLEMENTAL INFORMATION |
|---|---|---|
| aaaa1 | MR. A | A DEPARTMENT |
| kkkk | GUEST USER | |
| bbbb1 | MS. B | FEE PLAN 1 |
| aaaa2 | MR. A | B DEPARTMENT |

| | | | |
|---|---|---|---|
| aaaa1 | MR. A | FIRST GROUP | A DEPARTMENT |
| kkkk | GUEST USER | | |
| bbbb1 | MS. B | SECOND GROUP | FEE PLAN 1 |
| aaaa1 | MR. A | FIRST GROUP | A DEPARTMENT |
| cccc1 | GUEST USER | | |
| | | | |

[INPUT COMPLETED] [CANCEL]

FIG. 8

| GROUP ID | GROUP NAME | IN-GROUP USER ID |
|---|---|---|
| g1 | FIRST GROUP | aaaa1,aaaa2 |
| g2 | SECOND GROUP | bbbb1 |

| 441 | 442 | 443 | 444 | 445 | 446 |
|---|---|---|---|---|---|
| PRINTER ID | PRINTER NAME | IP ADDRESS | LOG STORAGE LOCATION | AUTHENTICATION INFORMATION | COST COEFFICIENT |
| PPPA | PRINTER A | ADDRESS A | FOLDER A | ACCOUNT=R1 PW=******* | 1.0 |

FIG. 12

| 461 | 462 | 463 |
|---|---|---|
| MODEL NAME | CAPABILITY INFORMATION | BASIC COEFFICIENT |
| P-1 | MONOCHROMATIC LOW RESOLUTION | 1.0 |
| P-2 | COLOR HIGH RESOLUTION | 2.0 |

FIG. 13

PRINTING SYSTEM CONFIGURED TO COLLECT PRINT LOG OF PRINTER, MANAGEMENT DEVICE THEREFOR, AND NON-TRANSITORY COMPUTER-READABLE RECORDING MEDIUM FOR MANAGEMENT DEVICE

CROSS-REFERENCE TO RELATED APPLICATIONS

This is a Continuation Application of International Application No. PCT/JP2020/012982 filed on Mar. 24, 2020, which claims priority from Japanese Patent Application No. 2019-102406 filed on May 31, 2019. The entire disclosures of the prior applications are incorporated herein by reference.

BACKGROUND

The present disclosures relate to a printing system, a management device for the printing system, and a non-transitory computer-readable recording medium for the management device.

Conventionally, in a printing system with multiple printers, a technique is known in which a management device manages print logs of respective printers. For example, in a system which is provided with a PC for management and a plurality of printers, the PC typically collects the print logs stored in respective printer, categorizes the print logs based on group names contained in the print logs, and outputs statuses of users for respective groups based on, for example, monthly print amounts for respective users contained in the print logs.

SUMMARY

In the conventional technique as described above, each of the plurality of printers manages a lot of pieces of information, such as information on groups, users, and the print amounts for each user, and also perform various categorizations and statistical processes, such as totaling the monthly print amounts for each user. As a result, the memory and processing loads on the printer are relatively high, and a degree of freedom of the usable printers is narrowed.

According to aspects of the present disclosure, a computer of a management device can collect a plurality of print logs respectively generated by a plurality of printers. Each of the plurality of print logs contains print amount information and first category information, the print amount information indicating an amount of printing, and the first category information indicates a category of the print amount information. Further, the computer can identify a category represented by the first category information by referring to a first database in which the first category information is registered, and extract the print amount information of which category is indicated by identified first category information from the plurality of print logs collected in the collecting. The identified first category information is the first category information identified in the identifying. The computer can also generate output data based on the print amount information extracted in the extracting. The output data is based on output mode information. The computer can output the output data through an output interface of the management device.

BRIEF DESCRIPTION OF THE DRAWINGS

FIG. 6 illustrates an example of a user registration DB.

FIG. 7 illustrates an example of an input form for user registration.

FIG. 8 illustrates an example of a group registration DB.

FIG. 12 illustrates an example of a printer registration DB.

FIG. 13 illustrates an example of a coefficient information DB.

DESCRIPTION OF THE EMBODIMENT

Hereinafter, a printing system according to an embodiment of the present disclosures will be described with reference to the accompanying drawings. The present embodiment discloses a printing system 100 including a personal computer (hereinafter referred to as a "PC") and a plurality of printers, wherein the PC is configured to manage the plurality of printers.

Figure 1:
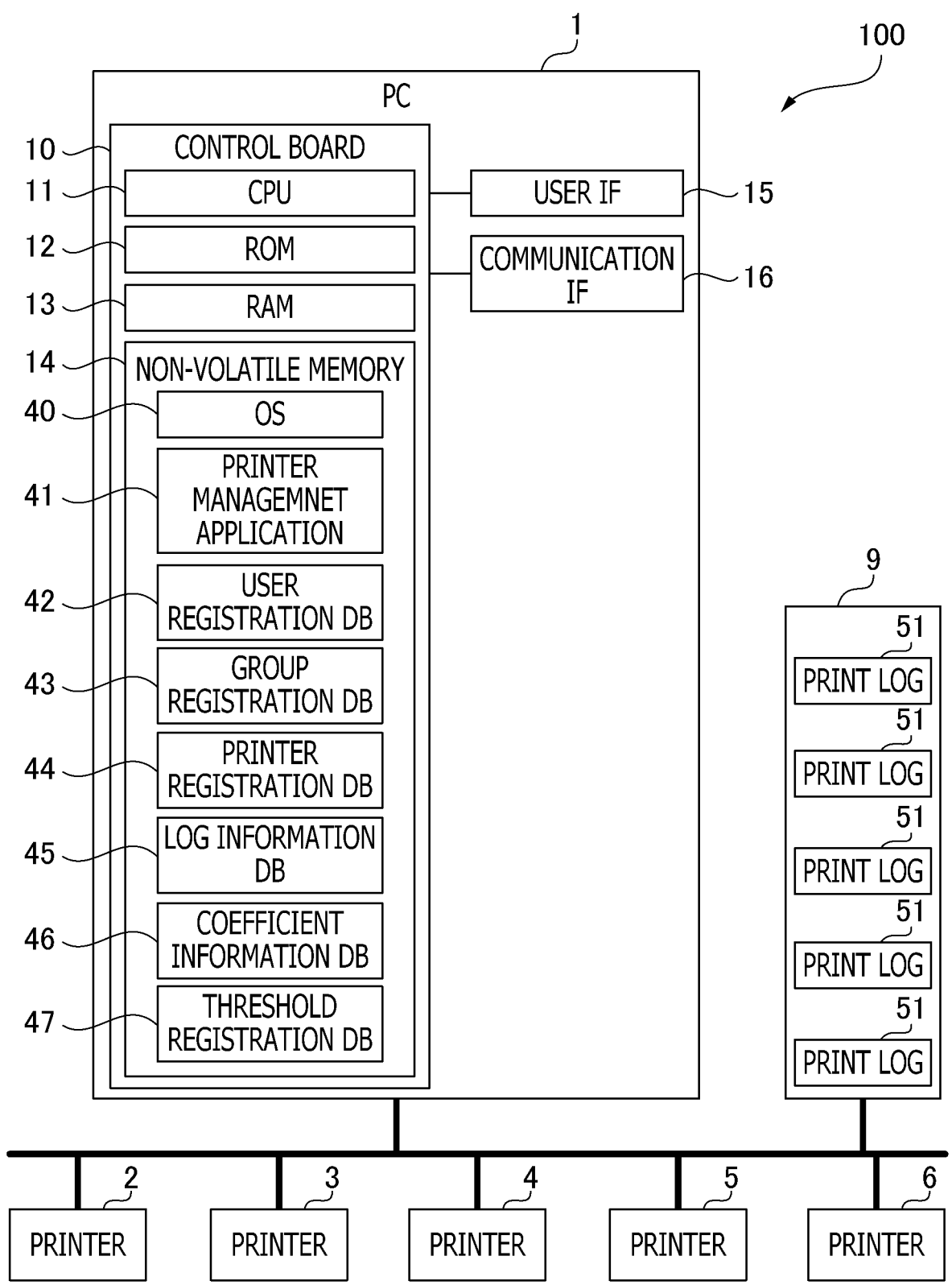
FIG. 1 is a block diagram of a printing system according to aspects of the present disclosures.

As shown in FIG. 1, the printing system 100 includes a PC 1, a plurality of printers 2-6, and a file server 9, which are connected to each other by a network. The PC 1 is an example of an information processing device as well as a management device. Instead of the PC 1, the printing system 100 may include, for example, a tablet computer or a smartphone. The file server 9 is an example of an external device.

The printers 2-6 are devices each of which has both printing and communication functions. As shown in FIG. 1, each of the printers 2-6 is configured to communicate with the PC 1 and the file server 9, and is configured to perform printing based on print jobs received from various devices, or based on print jobs input by an operation panel of the printer itself. The printers 2-6 are of the same model or different models. Further, the printers 2-6 may be installed in the same location or different locations.

Each of the printers 2-6 is configured such that, when executing printing based on a received print job, each of the printers the printers 2-6 generates one print log record for each print job executed and store the generated print log in a particular storage location. The printers 2-6 store the information on the storage location of the print log record in their own devices. In the present embodiment, the file server 9 is designated as the storage location, and the printers 2-6 transmit the generated print log records to the file server 9. To the print job, a user ID indicating a user who has instructed to execute printing based on the print job is attached. Each of the print log records generated by the printers 2-6 includes at least the user ID information of the print job and the information of the number of sheets or the number of surfaces on which printing is performed. It is noted that the print log record is an example of a print record.

The printers 2-6 may be configured to transmit the print log records to the file server 9 every time they execute printing, or store the generated print log records once in the memory of their own device and collectively transmit the same to the file server 9 periodically, such as every hour. Since the file server 9 is a device different from the PC 1, each printer 2-6 can transmit the print log records even when the PC 1 is not running.

The printers 2-6 have information on printing restrictions in their own memories, and have a function to determine whether or not to execute printing based on the received print job, and to restrict printing when it is determined that the print job is not to be executed. In other words, printers 2-6 do not execute printing when the user ID of the user who instructed execution of the received print job is included in the user ID stored as a restriction target. The information on the printing restriction is, for example, information on the user ID that is allowed to print, information on the user ID that is restricted from printing, and the like. The PC 1 may identify the user ID that is the target of the printing restriction and transmit an instruction to restrict printing or an instruction to release the restriction to printers 2-6. The printers 2-6, for example, update the information on printing restriction in their own memories based on the instructions received from the PC 1.

The file server 9 is a device that has communication and storage functions. As shown in FIG. 1, the file server 9 is configured to communicate with the PC 1 and the printers 2-6, and stores the print log 51 including the print log records received from the printers 2-6. The file server 9 has, for example, a print log 51 as an individual folder for each transmission source printer (i.e., each transmitting printer), and each of the printers 2-6 transmits the print log record with designating the print log 51, which is a predetermined folder, as the destination. The file server 9 may be a cloud server that may be accessed via the Internet.

As shown in FIG. 1, the PC 1 according to the present embodiment has a control board 10 that includes a CPU 11, a ROM 12, a RAM 13, and a non-volatile memory 14. Further, the PC 1 has a user interface (hereinafter referred to as a "user IF") 15 and a communication interface (hereinafter referred to as a "communication IF") 16, which are electrically connected to the control board 10. It is noted that the CPU 11 is an example of a computer.

It is noted that the ROM 12, the RAM 13, and the non-volatile memory 14 are examples of a memory, and any of the examples of the memory is an example of a computer-readable storage medium. A computer-readable storage medium is a non-transitory medium. The non-transitory medium includes recording media such as a CD-ROM, a DVD-ROM, and the like. The non-transitory medium is also a tangible medium. On the other hand, an electrical signal carrying a program that is downloaded from a server on the Internet or the like is a computer-readable signal medium, which is a type of computer-readable medium, but is not included in the non-transitory computer-readable storage media.

The ROM 12 stores a startup program, and the like for starting the PC 1. The RAM 13 is used as a work area when various processes are executed or as a storage area for temporarily storing data. The non-volatile memory 14 is, for example, an HDD or a flash memory, and is used as an area for storing programs such as various application programs (hereinafter referred to as "applications"), data such as image data, and various settings.

The CPU 11 executes various processes according to the program read from the ROM 12 and non-volatile memory 14, and based on the user's operation. The control board 10 in FIG. 1 is a generic term for the hardware and software used to control the PC 1, and does not necessarily represent a single piece of hardware that actually exists in the PC 1.

The user IF 15 includes hardware configured to receive operations by the user and display information. In other words, the user IF 15 is equipped with both functions of receiving input and displaying information. The user IF 15 may be a device that has both input and display functions, such as a touch panel, or a combination of a display, and a keyboard and/or mouse. The display by the user IF 15 is an example of output of output data, and the user IF 15 is an example of an output interface.

The communication IF 16 includes hardware configured to communicate with various external devices. The communication method of the communication IF 16 may be wireless or wired, or may support multiple communication methods. The communication IF 16 may include network communication by LAN, Wi-Fi®, and the like. The communication IF 16 may also include one-to-one communication such as a USB communication, Bluetooth®, and/or other short-range communication. Transmission by the communication IF 16 is an example of output of the output data output, and the communication IF 16 is an example of an output interface.

Various programs and data are stored in the non-volatile memory 14 of the PC 1. The various programs and data include an operating system (hereinafter referred to as an "OS") 40, a printer management application 41, and various databases (hereinafter referred to as "DBs") 42-47. The OS 40 is, for example, Windows®, MacOS®, Linux®, iOS®, and/or Androids®. A part of the OS 40 may be included in the ROM 12. The printer management application 41 is an example of a program.

The printer management application 41 according to the present embodiment will be described next. Each processing step of a process and a flowchart in the following description basically indicates the process of the CPU 11 according to the instructions described in the program such as the printer management application 41. In other words, the processes such as "determination," "extraction," "selection," "calculation," "decision," "identification," "reception," "control," and the like in the following description represent the processes of the CPU 11. The process by the CPU 11 includes hardware control using the IF (also called as an API) for exchanging data with other modules of the OS 40 of the PC 1. In the following description, the operation of each program is described with omitting the description on the OS 40. That is, in the following description, a statement such as "program P controls hardware H" may refer to "program P controls hardware H using the API of the OS 40."

In addition, "obtaining" is used in a concept that does not require a request. Thus, a process of receiving data without a request by the CPU 11 is also included in the concept of "obtaining data by the CPU 11." Further, "data" in this specification is represented by a computer-readable bit string. The data with the same substantive meaning content but different formats will be treated as the same data. The same applies to "information" in the following description. In addition, "requesting" and "indicating" are concepts that indicate that information indicating what is being requested or indicated is to be output to the other party. The information indicating that it is being requested or instructed is also described simply as "requesting" or "indicating."

It is noted that the process of the CPU 11 according to instructions described in a program may be described in abbreviated wording. For example, it may be described as "performed by the CPU 11" or "performed by the printer management application 41." In addition, a process of the CPU 11 according to instructions described in a program may be described in a phrase in which recitation of "the CPU" is omitted, such as "Program A performs." Also, a process by the CPU 11 to determine whether information A indicates a matter B or not may be described conceptually, such as "determine whether matter B from information A." Furthermore, a process by the CPU 11 to determine whether information A indicates matter B or matter C may be conceptually described as "determine whether matter B or matter C based on information A."

The printer management application 41 according to the present embodiment is an application for managing a plurality of printers 2-6 from the PC 1. The printer management process by the printer management application 41 according to the present embodiment will be described with reference to a flowchart in FIG. 2. This process is executed by the CPU 11 when the startup of the printer management application 41 is received. It is noted that login with administrative privileges may be required to start the printer management application 41. In the following description, the user who uses the printer management application 41 is referred to as an "administrator" so as to be distinguished from the user who uses the printers 2-6.

When the printer management application 41 is started, the CPU 11 initially executes a log update process (S101). The log update process is a process of obtaining print logs 51 stored by the printers 2-6 from their storage locations and updating the contents of the log information DB 45 (see FIG. 1) stored in the non-volatile memory 14 of the PC 1 using the obtained print logs 51.

The procedure of the log update process is described with reference to a flowchart in FIG. 3. A setting of a storage location of the print log 51 will be described later.

In the log updating process, the CPU 11 first obtains a plurality of print logs 51 from the storage location of the print logs 51 (S201). Then, the CPU 11 checks the print log records, which are contained in each of the obtained print logs 51, one-by-one. Concretely, the CPU 11 obtains one print log record from the print log 51 (S202), and determines whether a record containing the same information as the obtained print log record is already included in the log information DB 45 (S203). In the following description, the records included in the log information DB 45 are referred to as "log DB records" to distinguish the same from the print log records generated by the printers 2-6. The log DB record is a record generated based on the print log record, and contains the same information as the print log record. In S203, the CPU 11 determines whether there exists the log DB record in the log information DB 45. The log DB record contains, for example, a printer ID indicating the printer that has generated the obtained print log record, and a print execution date and time or a print job name contained in the print log record.

When, for example, the print log record contains a unique serial number, the CPU 11 may use such a serial number to make the determination in S203. The CPU 11 may also be configured to store the last log update date and time and to obtain only the print log records stored after the last date and time, in which case the system may proceed to S204 without making the determination in S203.

Figure 4:
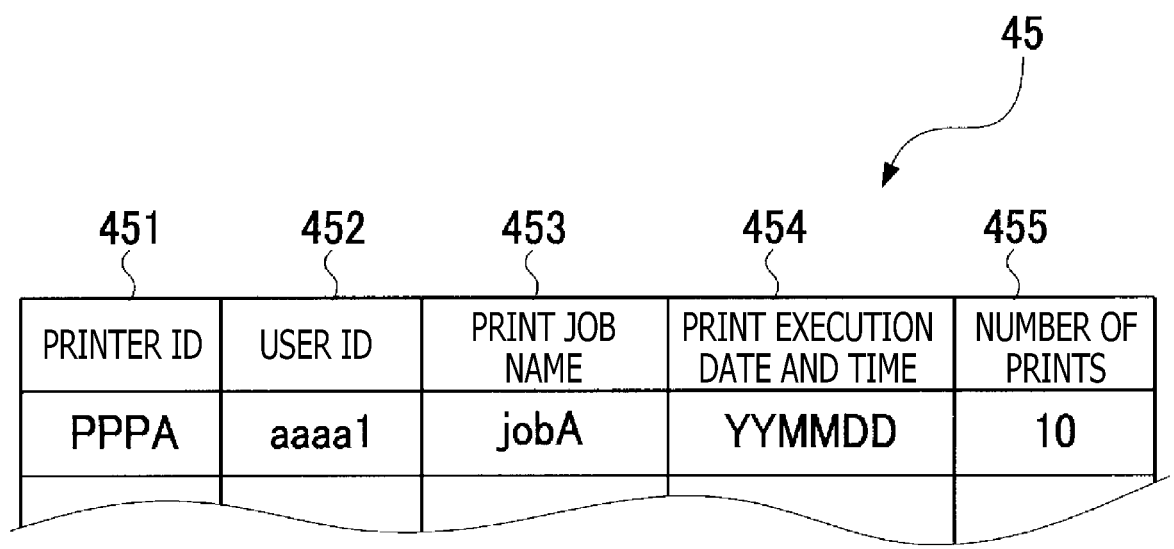
FIG. 4 illustrates an example of a log information DB (database).

The log information DB 45 is a database that stores information based on the print log 51, and includes, for example, a log DB record with which each of the following information is associated: a printer ID 451, a user ID 452, a print job name 453, print execution date and time 454, and the number of prints 455, as shown in FIG. 4. The printer ID 451 is information that identifies the printer that has generated the print log record that contains the same information as this log DB record, i.e., the printer that executed the print indicated by this print log record. The PC 1 determines the printer ID 451 based on information indicating a folder from which the log DB record is read out. The printer ID 451 may be included in the print log records generated by printers 2-6.

The user ID 452 is information that indicates an originator of the print job and identifies the user who has instructed the execution of the print job. The user ID 452 is an example of a first category information. The user ID 452 and the print job name 453 are information that is assigned to the print job by the originator of the print job and that can be obtained by the printers 2 to 6. The originator of the print job is, for example, a PC or a mobile device with an OS such as Windows, and the user ID included in the print log record is the user ID used by the OS. The printers 2-6 can then execute printing restrictions based on the user ID of the obtained print job, as described above.

The print job name 453 is information that identifies the print job, for example, the name of the file subjected to be printed. The print execution date and time 454 is information that indicates the date and time when the printing based on the print job is instructed. The number of prints 455 is information indicating the amount of printing performed in the print job. The number of prints 455 may be the number of sheets of paper printed or the number of printed surfaces. For example, in the case of both-side printing, the number of sheets is 1 while the number of printed surfaces is 2. In the following description, a case where the number of sheets of printing paper is used as the number of prints 455. The number of prints 455 is an example of information that indicates the amount of printing and is an example of printing amount information. The print log records generated by the printers 2-6 do not have to be in the same format as the log information DB 45 shown in FIG. 4, but may be in a different format for each printer.

When it is determined that the log DB record corresponding to the obtained print log record is not included in the log information DB 45 (S203: NO), the CPU 11 determines whether the user ID 452 is registered in a user registration DB 42 (see FIG. 1) stored in the non-volatile memory 14 (S204). The user registration DB 42 is a database that stores information on users whose registration is received by the printer management application 41. the CPU 11 determines that the user ID 452 has not been registered in the user registration DB 42, or that the user name and other information associated with the user ID 452 are unregistered (e.g., a user name registered in the user registration DB 42 is "Guest User"), a negative determination is made in S204 (i.e., S204: NO).

Figure 5:
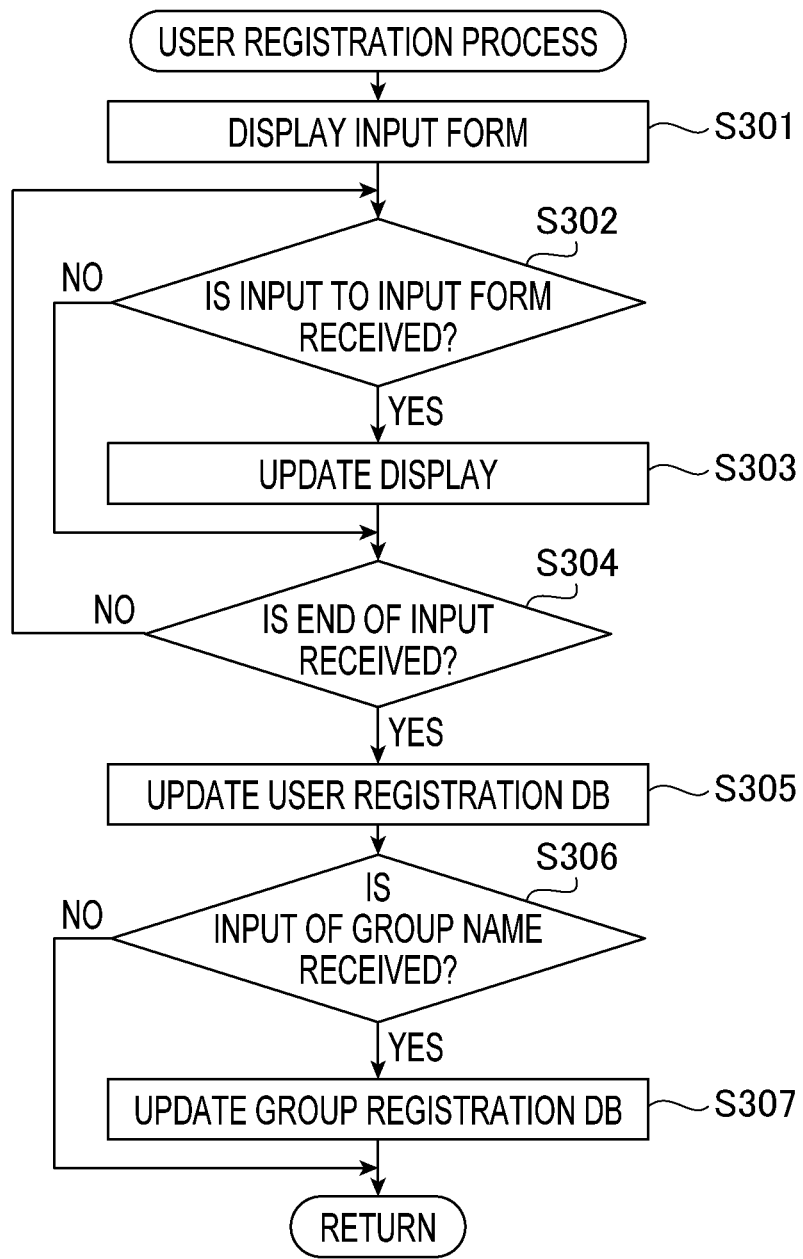
FIG. 5 is a flowchart illustrating a user registration process.

When it is judged that the information of user ID 452 is unregistered (S204: NO), the CPU 11 executes a user registration process (S205). The user registration process is a process to register the information of the user who uses the printers 2-6 in the user registration DB 42. The procedure of the user registration process is described with reference to the flowchart in FIG. 5. It is noted that the user registration process is executed not only when the negative determination is made in S204, but also is executed in response to an execution instruction by the administrator, as described later.

The user registration DB 42 includes, for example, records with each of the following information associated therewith: a user ID 421, a user name 422, and supplementary information 423, as shown in FIG. 6. The user registration DB 42 is an example of a first database. The user ID 421 is information that identifies a user subjected to be registered and corresponds to the user ID 452 in the log information DB 45. The user ID 421 is an example of a first category information.

The user name 422 is, for example, the name to be displayed as the user name when the printer management application 41 outputs information for managing the printers 2-6. The administrator sets a name that is easy to understand to identify the user as the user name 422. The user name 422 may be the same as the user ID 421 or may be different. The user name 422 is an example of the second category information. The supplementary information 423 is, for example, information indicating a department to which the user belongs and a fee plan for using the printer.

In the user registration DB 42, for example, the same user name 422 can be set for multiple user IDs 421 as shown in FIG. 6. For example, in the case of a user who uses different accounts for a PC and a mobile device, it is highly likely that different user IDs 452 will be stored in the print log records of print jobs instructed to be printed from the respective devices. The administrator can set one user name 422 for multiple user IDs 421 for users who use multiple accounts. If the same user name 422 is set for different user IDs 421, the printer management application 41 can combine the information about all user IDs 421 with the same user name 422 as the information of the same user.

In the user registration process, as shown in FIG. 7, the CPU 11 displays an input form 61 on the user IF 15 to receive the input of each information to be registered in the user registration DB 42 (S301). The input form 61 is a form for receiving the input of information to be used for updating the user registration DB 42, and includes information 611 of registered users, an input field 612 of new users, a free addition field 613, and an input completion button 614. The registered user information 611 is information about users already registered in the user registration DB 42, and the information of each user read from the user registration DB 42 is displayed. In the input field 612 for a new user, for example, the user ID 452 of the print log record, which is not yet registered in the user registration DB 42, and "Guest User" as a temporary user name are displayed. By receiving the input of information about the unregistered user ID 452 contained in the print log record, unnecessary registration to the user registration DB 42 can be avoided. In the free addition field 613, all input fields are empty, and no information is input in the input fields.

As shown in FIG. 7, the input form 61 also has a group name input field that receives the input of a group name. In the user registration process, the settings of the group to which the user belongs can also be received.

In S302, the CPU 11 determines whether the input to the input form 61 has been received. The CPU 11 receives the input of information by detecting the input to each field of the input form 61. When the CPU 11 determined that the input has been received (S302: YES), the display of the input form 61 is updated based on the received input (S303). When the input of a user name is received in the input form 61, S302 is an example of the user name obtaining process. For example, when the user name for which the input is received is the same as the user name already registered in the user registration DB 42, the CPU 11 displays the information associated with the registered user name in the input form 61. When the input of the registered user name is received, the CPU 11 may display a message indicating that the same user name is commonly registered for multiple user IDs and receive an approval of the administrator. Then, when the approval is obtained, the CPU 11 may display information associated with the user name on the input form 61.

After execution of S303 or when it is determined that the input to the input form 61 has not been received (S302: NO), the CPU 11 determines whether an instruction for completion of input has been received (S304). The CPU 11 receives the instruction for completion of input as the input completion button 614 is operated. When it is determined that the instruction for completion of input has not been accepted (S304: NO), the CPU 11 returns to S302 to determine again whether the input has been received.

When it is determined that the instruction for completion of input has been received (S304: YES), the CPU 11 updates the user registration DB 42 based on the information displayed in the input form 61 (S305). It is noted that S305 is an example of a category information registration process. The CPU 11 generates, for example, a log DB record containing the information displayed in the input field 612 of the new user, and adds the generated log DB record to the user registration DB 42. The user name of the log DB record added to the user registration DB 42 based on the input field 612 of the new user is a "guest user" automatically assigned by the CPU 11 or a user name accepted for input by an administrator, and is a user name obtained from a different source than the print log 51. When the information of a new user is entered in the user addition field 613, the CPU 11 generates the log DB record containing the information being displayed and adds the same to the user registration DB 42.

The CPU 11 determines whether the input of the group name to which the user belongs has been received in the input form 61 for the user to be registered (S306). When it is determined that the input of the group name has been received (S306: YES), the CPU 11 updates the group registration DB 43 (see FIG. 1) (S307). When the specification of the group name is received, S302 is an example of the group reception process, and S307 is an example of the group registration process and also an example of the category information registration process.

The group registration DB 43, for example, contains records in which a group ID 431, a group name 432, and an in-group user ID 433 are associated with each other as shown in FIG. 8. The group ID 431 is information that identifies the group. The group name 432 is, for example, a name to be displayed as a group name when the printer management application 41 outputs information for managing the printers 2-6. The group name 432 is the name entered in the group name input field of the input form 61. The in-group user ID 433 is the user ID of each user belonging to the group, and is the user ID that was displayed in the input form 61 in association with the group name input field. The group registration DB 43 is an example of a third database, and the group name 432 is an example of group information.

In S307, when the input group name matches the group ID 431 or the group name 432 already stored in the group registration DB 43, the CPU 11 adds the user ID 421 of the user subjected to be registered to the in-group user ID 433 of the group in question. It is noted that, when there is no group ID 431 or group name 432 already stored in the group registration DB 43 that matches the input group name, the CPU 11 generates a new group to register the same in the group registration DB 43.

After execution of S307, or when it is determined that the input of the group name is not received (S306: NO), the CPU 11 terminates the user registration process and returns to the log update process in FIG. 3.

Figure 3:
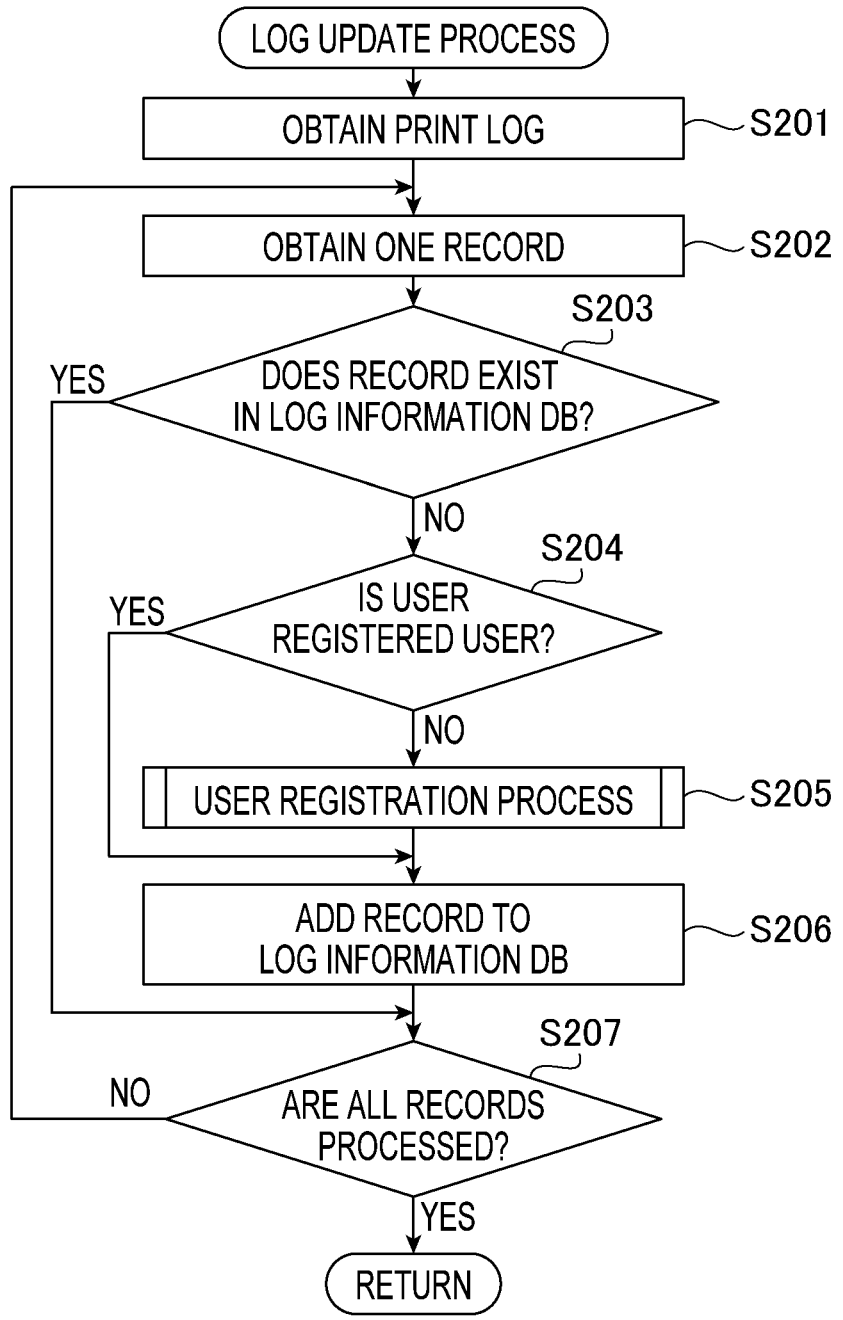
FIG. 3 is a flowchart illustrating a log updating process.

Returning to the description of the log update process in FIG. 3, after execution of the user registration process in S205 or when it is determined that user ID 452 has already been registered (S204: YES), the CPU 11 adds the log DB record corresponding to one print log record received in S202 to the log information DB 45 (S206). It is noted that S206 is an example of a collection process.

Then, after execution of S206 or when it is determined that the log DB record corresponding to the print log record acquired in S202 has already been stored in the log information DB 45 (S203: YES), the CPU 11 determines whether all the print log 51 records obtained from the file server 9 in S201 has been processed (S207). When it is determined that there are print log records that have not been processed (S207: NO), the CPU 11 returns to S202 and processes the next print log record. When it is determined that all the print log records have been processed (S207: YES), the CPU 11 terminates the log update process and returns to the printer management process of FIG. 2.

Figure 2:
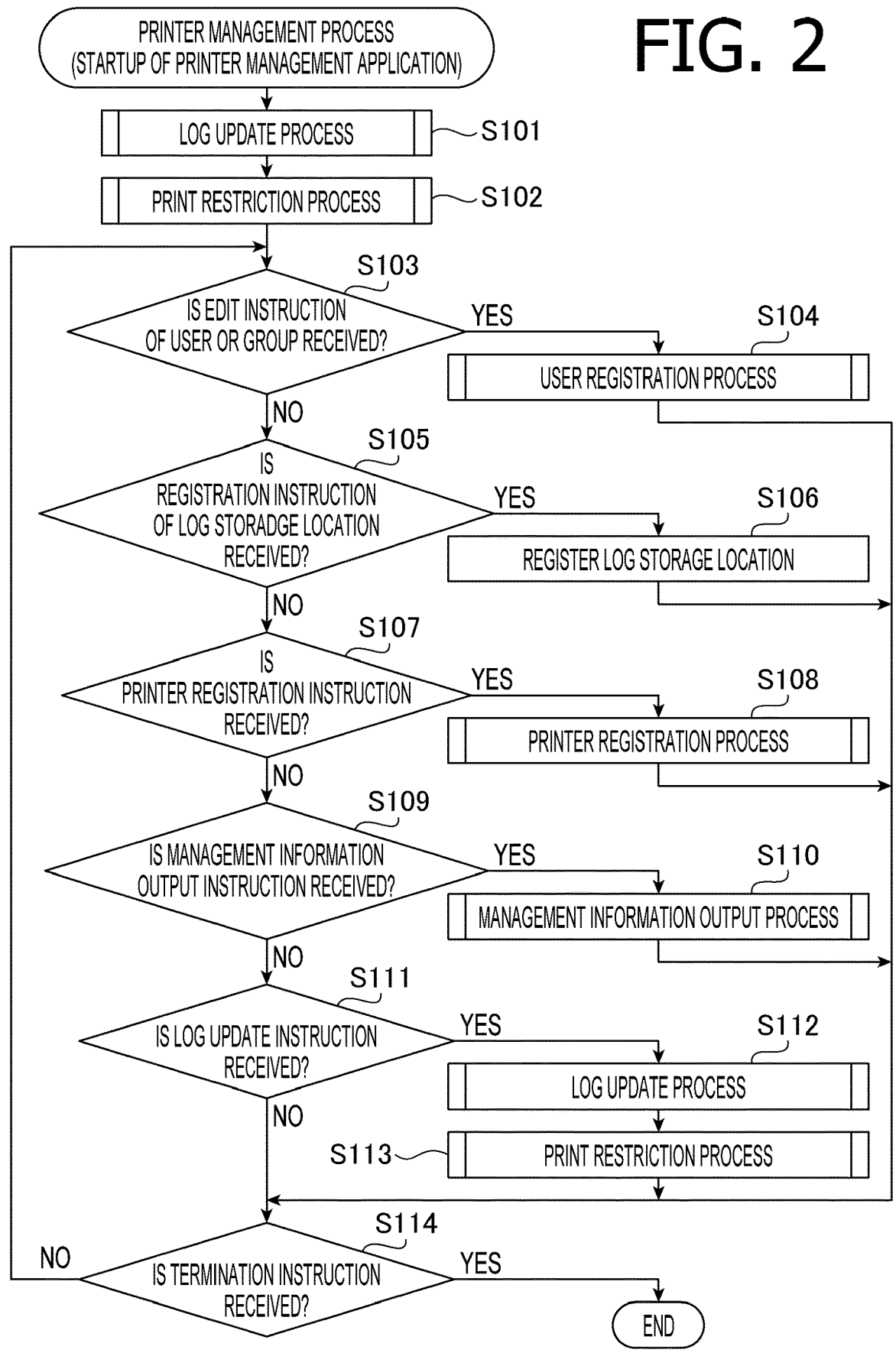
FIG. 2 is a flowchart illustrating a printer management process.
Figure 9:
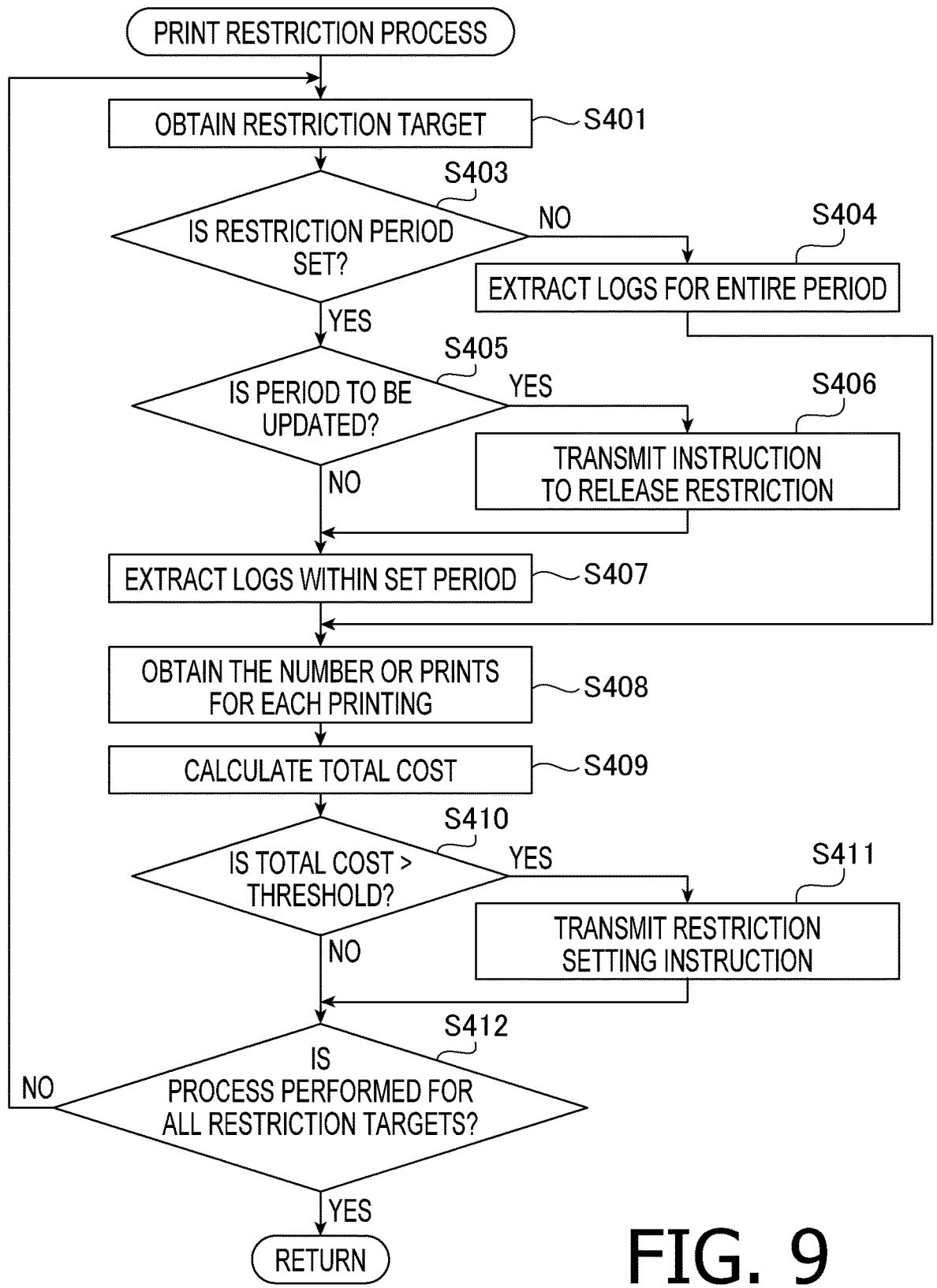
FIG. 9 is a flowchart illustrating a print restriction process.

Returning to the description of the printer management process in FIG. 2, the CPU 11 executes a print restriction process (S102) after executing the log update process of S101. The print restriction process is a process to set print restrictions based on the information in the log information DB 45 updated in the log update process. The procedure of the print restriction process will be described with reference to a flowchart in FIG. 9.

Figure 10:
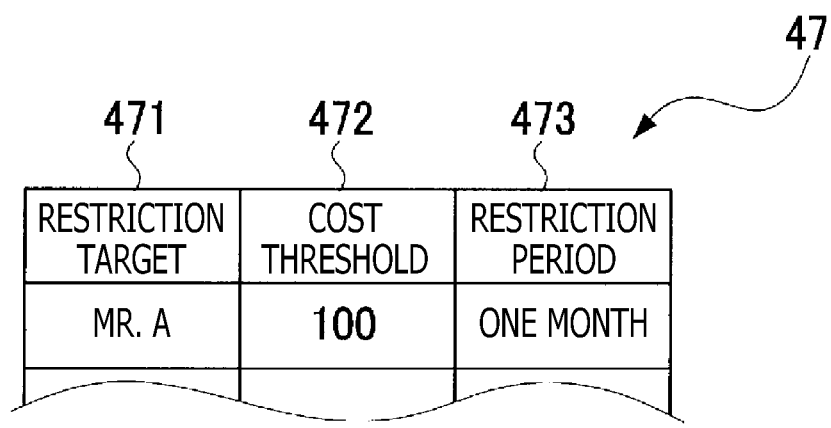
FIG. 10 illustrates an example of a threshold registration DB.

In the printing restriction process, the CPU 11 refers to the threshold registration DB 47 (see FIG. 1) and obtains information indicating a user who is subjected to the print restriction (S401). The threshold registration DB 47 includes, for example, a record to which a restriction target 471, a cost threshold 472, and a restriction period 473 are associated, as shown in FIG. 10☐ The threshold registration DB 47 is set, for example, by the administrator. The restriction target 471 is the information of the user name or group name, which indicates that the user or group is subject to the restriction.

The cost threshold 472 is information that indicates a range of printing allowed on printers 2-6 for users or groups of the restriction target 471. The restriction period 473 is information indicating a period during which the restriction by the cost threshold 472 is applied to the users or groups of the restriction target 471. The limitation period 473 may be, for example, information indicating a period of time such as one month, or information indicating the end of the period such as a date and time. The period of limitation 473 may be a finite period of time, or it may be no period of time, i.e., an indefinite period of time. The limitation period 473 may be a recent period that indicates the most recent number of days, and the like. The limitation period 473 may be a set period that switches at a particular timing, such as years.

The CPU 11 determines whether a restriction period 473 is set for the restriction target 471 (S403). When it is determined that the restriction period 473 is not set (S403: NO), the CPU 11 extracts the log DB records of all user IDs corresponding to the restriction target 471 from the log information DB 45 for the entire period (S404). When the restriction target 471 is the user name, the CPU 11 extracts, by referring to the user registration DB 42, the log DB records of all user IDs for which the user name is set. When the restriction target 471 is a group name, the CPU 11 refers to the group registration DB 43 and extracts the log DB records of all user IDs included in the group of the group name.

On the other hand, when it is determined that the restriction period 473 is set (S403: YES), the CPU 11 determines whether the period has been updated between the execution of the previous log update process and the start of the current process (S405). When a set period that switches at a regular timing is set to the restriction period 473, the period is determined to have been updated when the period switching timing is exceeded between the execution of the previous log update process and this time. For example, when a month is set as the set period and a month is crossed between the last time and this time, or when a day is set as the set period and a day is crossed between the last time and this time, the period is determined to have been updated. When the end of the period has been set to the restriction period 473, the period is considered to have been updated when the set end of the period has been exceeded between the last time the log update process was executed and this time. For example, when a particular date and time is set as the end of the period, and that date and time has been exceeded between the last time and this time, the period is considered to have been updated. The log update process may be executed not only when the printer management application 41 is started or when an execution instruction is received by the administrator, but also, for example, at a regular update timing.

When it is determined that the period has been updated (S405: YES), the CPU 11 transmits a command including instructions to release the restrictions for all user IDs corresponding to the restriction target 471 obtained in S401 to each of the printers 2-6 (S406). As described above, the printers 2-6 have information on printing restrictions in their own memory. The printers 2-6 update the information of their own device in response to the receipt of a command instructing them to release the restriction, and thereafter do not restrict printing for the user ID identified by the command.

After execution of S406 or when it is determined that the period has not been updated (S405: NO), the CPU 11 extracts the log DB records of all user IDs corresponding to the restriction target 471 obtained in S401 from the log information DB 45 during the current period (S407). When the most recent period has been set, the CPU 11 extracts the log DB records within that period retroactively from the current time.

After execution of S404 or S407, the CPU 11 obtains the number of prints for each printer from the extracted log DB record (S408), and calculates the total cost during the relevant period for the restriction target 471 (S409). The total cost is the value obtained by calculating the individual cost by multiplying the number of prints for each printer by the cost coefficient of the printer concerned, and then summing up the calculated individual costs for all printers. The cost coefficient is a unit value for the number of prints, and, for example, a coefficient that indicates the cost of printing one sheet on the printer in question. The cost coefficient is an example of a unit value, and the total cost is an example of an evaluation value.

According to the printer management application 41, a cost coefficient is set for each of the printers 2-6. For example, the cost of printing a single sheet of paper on a high-end printer that can print in color at high resolution is likely to be higher than the cost of printing a single sheet of paper on a low-grade printer that can only print in monochrome at low resolution. In the present embodiment, a cost coefficient is set for each of the printers 2-6 to calculate the total cost, taking into account the differences among printers. The cost coefficients may be set individually by the administrator or automatically by the printer management application 41. The process of setting the cost coefficients is described later.

Then, the CPU 11 determines whether the calculated total cost is greater than a cost threshold 472 set for the restriction target 471 (S410). When the total cost is determined to be greater than the cost threshold 472 (S410: YES), the CPU 11 transmits a command including instructions to set a restriction on printing for each user ID included in the restriction target 471 to all printers 2-6 (S411). It is noted that S411 is an example of restriction processing, and the command sent in S411 is an example of a restriction command. When the user name is set as the restriction target 471, the set user name is an example of identified second category information.

The printers 2-6 update their own information in response to the receipt of the command transmitted from the PC 1 in S411, and thereafter restrict the printing of the user ID designated by the command. In other words, the printers 2-6 do not execute printing based on the instructed print job when the user ID assigned to the received print job is included in the user ID stored as the restriction target.

After execution of S411, or when it is determined that the total cost is not greater than a cost threshold 472 (S410: NO), the CPU 11 determines whether the processes for all restriction targets 471 have been completed (S412). Instead of S405 and S406, for example, when it is determined to be NO in S410, a command including an instruction to release the restriction of all user IDs corresponding to the restriction target 471 may be transmitted to each of the printers 2-6. When it is determined that the process has not been completed (S412: NO), the CPU 11 returns to S401 and processes the next restriction target 471. When it is determined that the processes for all the restriction targets 471 have been completed (S412: YES), the CPU 11 terminates the print restriction process and returns to the printer management process of FIG. 2.

Returning to the description of the printer management process in FIG. 2, after execution of the print restriction process in S102, the CPU 11 receives various instructions via the user IF 15. The CPU 11 displays various buttons for receiving instructions on the user IF 15, for example, and receives operations of respective buttons. The CPU 11 receives, for example, instructions to register a user, instructions to register a group, instructions to register a printer, instructions to output printer management information, instructions to update the log, and instructions to terminate the application.

The CPU 11 determines whether an instruction to edit the information of a user or a group is received (S103). The printer management application 41 according to the present embodiment, for example, receives editing the information of a user once registered as a guest user, registering a new user, or editing the information of a group. When it is determined that the instruction to edit the information of a user or a group is received (S103: YES), the CPU 11 executes the user registration process shown in FIG. 5 (S104). In S104, since no unregistered user ID is received, the displayed input form 61 does not include a new user's input field 612.

When it is determined that the instruction to edit the information of the user or group is not accepted (S103: NO), the CPU 11 determines whether the instruction to register the log storage location is received (S105). The log storage location is a storage location (e.g., a folder in the file server 9) where the print log 51 is stored in the printers 2 to 6. When it is determined that the instruction to register the log storage location is received (S105: YES), the CPU 11 receives the input of the log storage location and registers the information of the received log storage location (S106). The printer management application 41 receives the registration of the storage location and stores the same once in the non-volatile memory 14 before setting the information of the storage location to the printers 2 to 6. The storage location registered in the non-volatile memory 14 is used as a candidate for the storage location where the print log 51 is to be stored in the printers 2-6 in the printer registration process described below.

After execution of S106 or when it is determined that the instruction to register the log storage location is not received (S105: NO), the CPU 11 determines whether the instruction to register the printer is received (S107). When it is determined that the instruction to register the printer is received (S107: YES), the CPU 11 executes a printer registration process (S108). The printer registration process is a process to register a printer to be managed by the printer management application 41 in the printer registration DB 44 (see FIG. 1). The administrator, for example, instructs the execution of the printer registration process when a printer is added to the printing system 100.

Figure 11:
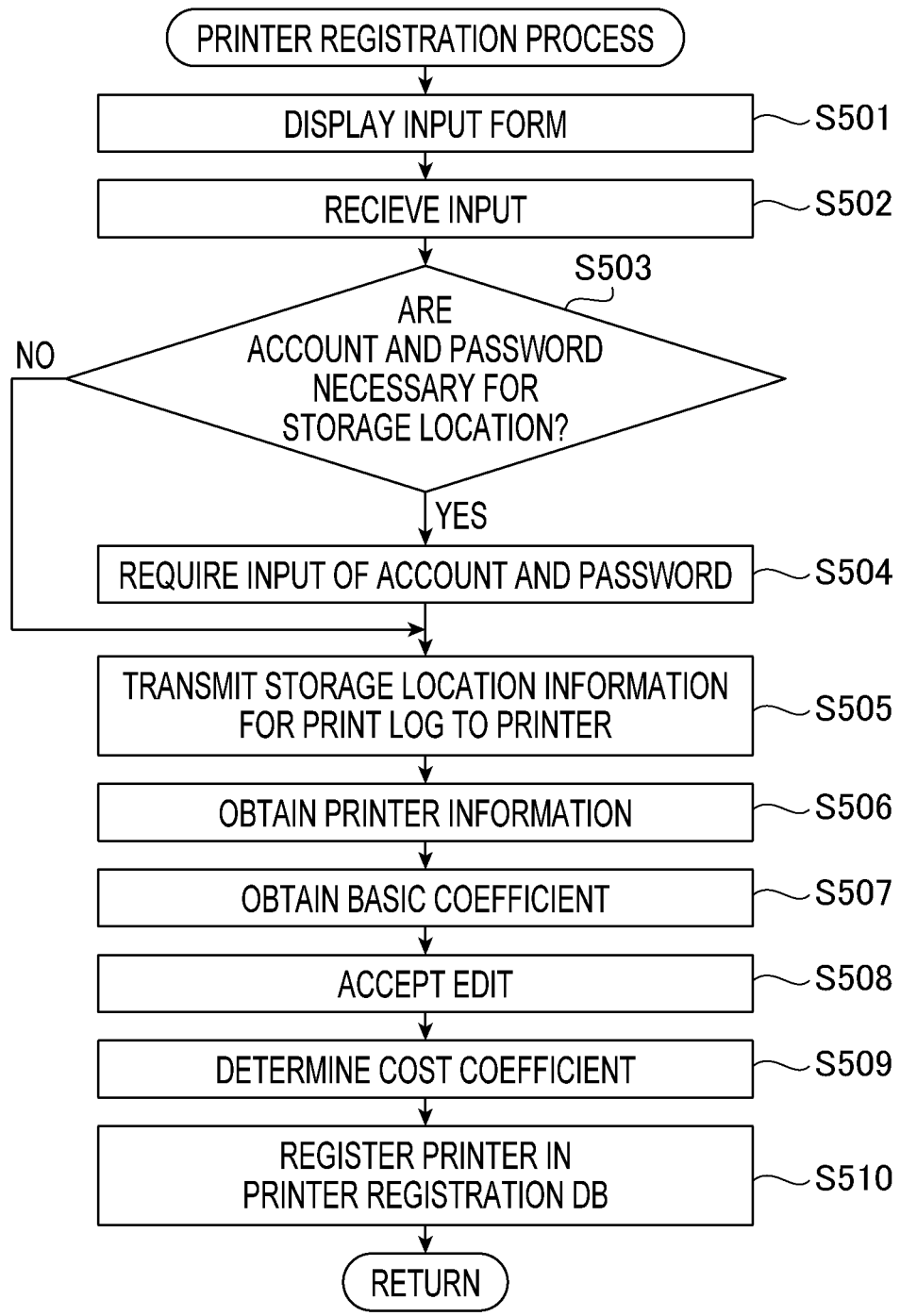
FIG. 11 is a flowchart illustrating a printer registration process.

The procedure of the printer registration process will be described with reference to the flowchart in FIG. 11.

In the printer registration process, the CPU 11 initially displays an input form on the user IF 15 to receive input of information about the printer to be registered (S501), and receives input of each information by detecting input to the input form (S502). The CPU 11 receives, as information about the printer, each information to be registered in the printer registration DB 44, such as the printer name, the IP address of the printer, the storage location of the print log record, and the specification of the cost coefficient.

The printer registration DB 44 includes, for example, records in which a printer ID 441, a printer name 442, an IP address 443, a log storage location 444, authentication information 445, and cost coefficient 446 are associated with each other. The printer ID 441 is printer identification information that identifies the printer subjected to be registered, and is information corresponding to the printer ID 451 in the log information DB 45. The printer name 442 is a name for the administrator to identify the printer to be registered. The IP address 443 is an address for the PC 1 to communicate with the printer subjected to be registered via the communication IF 16.

The log storage location 444 is information indicating the storage destination to which the printer subjected to be registered transmits and stores the print log record, and is, for example, a URL indicating a particular folder on the file server 9. The printer subjected to be registered is the target printer for collection to collect the print logs 51 at PC 1. The process of receiving the input of the log storage location 444 in S502 is an example of a destination information reception process. The CPU 11 displays a list of candidates for the log storage location 444 in the input form and receives the administrator's selection. The candidates for the log storage location 444 include, for example, information of the log storage location 444 stored in association with another printer, and information of the storage location registered based on the above-described instructions for registering the log storage location.

The authentication information 445 is the authentication information required for storing the print log in the storage location. When the authentication information such as an account or a password is required for storage in the storage location, the necessary information is stored in the authentication information 445. The cost coefficient 446 is a factor used to calculate the total cost in the print restriction process described above (see FIG. 9).

Based on the information accepted in the input form, the CPU 11 determines whether authentication information such as an account or a password is required to store the print log in the storage location (S503). When the designated storage location is, for example, a particular folder in a cloud server, the user is often asked to enter the authentication information. When it is determined that the account and the password are required (S503: YES), the CPU 11 displays a request for input of the authentication information 445 and receives the input (S504). Instead of making the determination in S503, the CPU 11 may ask the administrator whether the authentication information is required.

After execution of S504 or when it is determined that the account and the password are not required (S503: NO), the CPU 11 transmits information indicating the storage location of the print log record, which is the information entered as the log storage location 444, to the printer subjected to be registered via the communication IF 16 (S505). It is noted that S505 is an example of the transmission process. When the authentication information 445 has been input, the CPU 11 also transmits authentication information 445 to the printer. As a result, the printer subjected to be registered stores the received information of the storage location in its device and transmits the generated print log record to the storage location.

Then, the CPU 11 obtains the information indicating the characteristics of the printer subjected to be registered (S506). The CPU 11 obtains, for example, at least one of model identification information that identifies the model of the printer subjected to be registered, capability information that indicates the capability of the printer subjected to be registered, and print media information that indicates the print media to be used by the printer subjected to be registered as the information indicating the characteristics of the printer. The CPU 11 may obtain the information of the printer subjected to be registered from the printer itself or may receive input from the administrator. It is noted that the model identification information and the capability information are examples of characteristic information.

Based on the obtained information of the printer, the CPU 11 obtains basic coefficients by referring to a coefficient information DB 46 (see FIG. 1) (S507). For example, as shown in FIG. 13, the coefficient information DB 46 includes records in which a model name 461, capability information 462, and basic coefficient 463 are associated with each other. When the obtained information of the printer is the capability information, the CPU 11 obtains the basic coefficient 463 stored in association with the similar capability information 462. The model name 461 and capability information 462 are examples of unit value category information. The coefficient information DB 46 is an example of a fourth DB, and the basic coefficient 463 is an initial value of a unit value and is an example of an initial unit value.

In FIG. 13, as an example, the coefficient information DB 46 in which three types of information (i.e., the model name 461, the capability information 462, and the basic coefficients 463) are associated are shown. However, the coefficient information DB may further include printing medium information. Further, the coefficient information DB may also be a DB in which at least one of the model name, the capability information, and the printing medium information is associated with the basic coefficients 463.

Further, the CPU 11 receive edits to the obtained basic coefficients (S508) and determines cost coefficients (S509). The CPU 11, for example, displays the obtained basic coefficients on the user IF 15, receives edits by the administrator, and sets the edited values as the cost coefficients. The administrator edits the basic coefficients, for example, based on the installation location of each of the printers 2-6, the usage contract, the type of print media, and so on. Editing by the administrator need not be received, and when editing is not received, the basic coefficient becomes the cost coefficient.

Then, based on the received information, the CPU 11 registers the information of the printer subjected to be registered in the printer registration DB 44 (S510). In S510, the log storage location 444 of the printer subjected to be registered is associated with the printer ID 441 and registered in the printer registration DB 44. The printer registration DB 44 in this case is an example of the second database, and S510 is an example of the printer information registration process. Further, in S510, the cost coefficient 446 of the printer subjected to be registered is associated with the printer ID 441 and registered in the printer registration DB 44. The printer registration DB 44 in this case is an example of a fifth DB, and S510 is an example of the unit value registration process. After execution of S510, the CPU 11 terminates the printer registration process and returns to the printer management process of FIG. 2.

Returning to the description of the printer management process in FIG. 2, when it is determined that the instruction to register the printer is not accepted (S107: NO), the CPU 11 determines whether the instruction to output the management information of the printer is received (S109). When it is determined that the instruction to output the management information is received (S109: YES), the CPU 11 executes a management information output process (S110). The management information outputting process is a process of outputting various information necessary for managing the printer, and for example, a process of displaying the amount of printer usage for each user or group collectively on the user IF 15.

Figure 14:
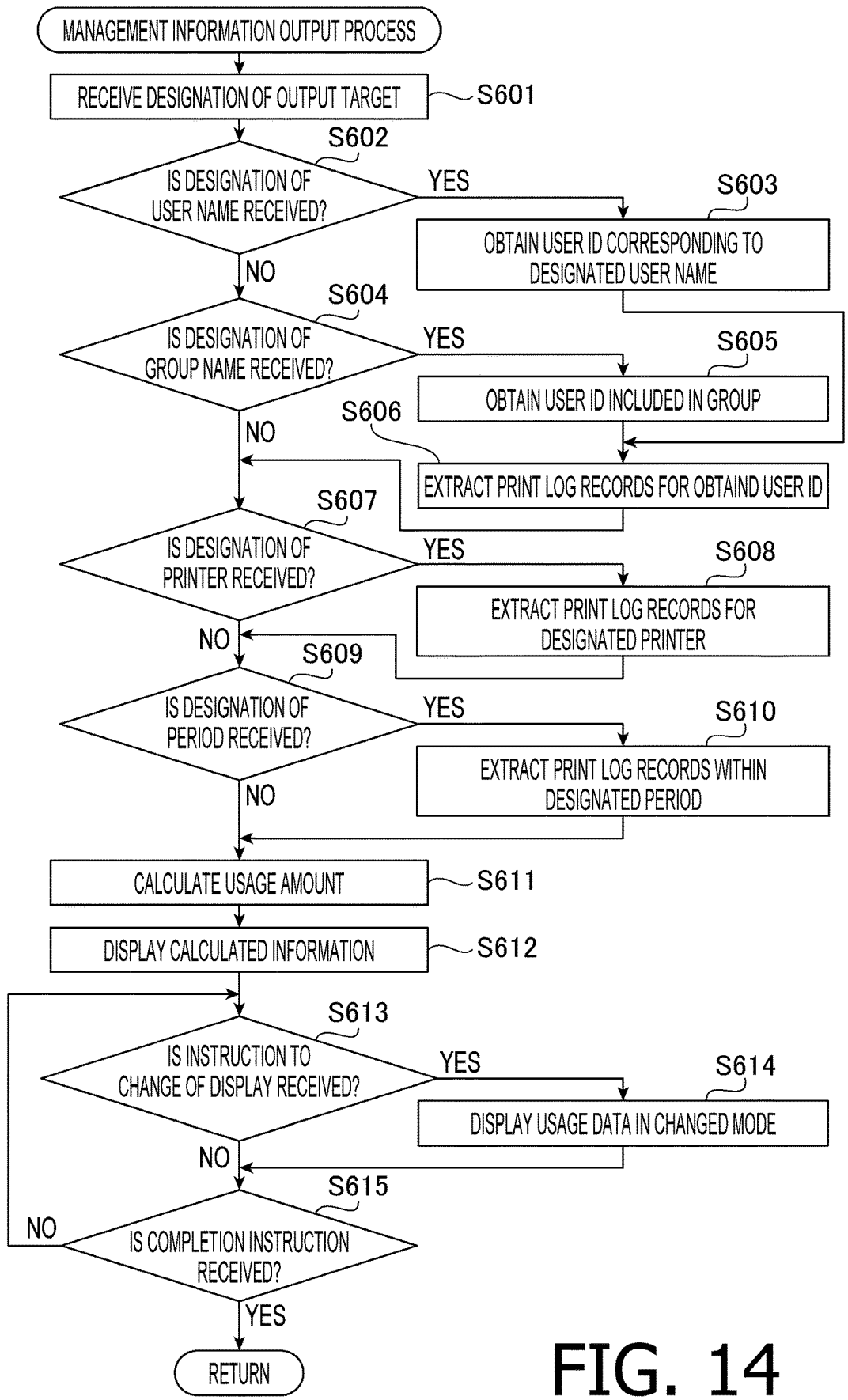
FIG. 14 is a flowchart illustrating a management information output process.

The management information output process is described with reference to the flowchart in FIG. 14. In the management information output process, the CPU 11 receives an instruction to designate an output target (S601). For example, the CPU 11 displays a list of the user names 422 registered in the user registration DB 42 and the group names 432 registered in the group registration DB 43 in the user IF 15. The CPU 11, for example, displays a list of user names 422 registered in the user registration DB 42 and group names 432 registered in the group registration DB 43 on the user IF 15 and receives the selection of a user name or a group name by the administrator. Then, the CPU 11 determines whether the designation of the user name 422 has been received (S602).

When it is determined that the designation of the user name 422 is received (S602: YES), the CPU 11 obtains all user IDs 421 stored in association with the designated user name 422 based on the user registration DB 42 (S603). In that case, all user IDs 421 are obtained for each designated user name 422.

When it is determined that the designation of the user name 422 is not received (S602: NO), the CPU 11 determines whether the designation of the group name 432 is received (S604). When it is determined that the designation of the group name 432 has been received (S604: YES), the CPU 11 obtains, based on the group registration DB 43, all user IDs included in the in-group user ID 433 stored in association with the designated group name 432 (S605). The CPU 11 may receive the designation of a plurality of group names 432. In this case, all user IDs are obtained for each of the designated group names 432.

After execution of S603 or S605, the CPU 11 extracts the log DB record that contains the obtained user ID from the log information DB 45 (S606). In the case where the designation of neither the user name 422 nor the group name 432 is accepted, all the user IDs are targeted for output. In that case, the CPU 11 extracts the log DB records of all user IDs in S606. It is noted that S606 is an example of the extraction process. The user ID obtained in S603 or S605 is an example of the identified first category information.

The CPU 11 determines whether the designation of a specific printer, which is a printer subjected to be output, has been received (S607). The CPU 11 displays, for example, a list of printer names 442 registered in the printer registration DB 44 on the user IF 15, and receives the selection of the specific printer by the administrator. When it is determined that the designation of the specific printer is received (S607: YES), the CPU 11 extracts a print log record that includes the printer ID 441 stored in association with the printer name 442 of the designated specific printer (S608). The CPU 11 obtains the printer ID 441 based on the printer registration DB 44, and further extracts a print log record whose printer ID 451 matches the obtained printer ID 441 from the print log record extracted in S606.

After execution of S608 or when it is determined that the designation of the printer is not received (S607: NO), the CPU 11 determines whether the designation of the extraction period is accepted (S609). The CPU 11 displays, for example, an input box on the user IF 15 to receive the input of the extraction period, and receives the input by the administrator. The extraction period may be, for example, a period with respect to the present time such as a recent one month or today, or a period specified by a particular start date and time and an end date and time. When it is determined that the designation of the extraction period is received (S609: YES), the CPU 11 further extracts the print log record from the print log record extracted in S606 or S608, where the print execution date and time 454 indicate within the designated period (S610).

After execution of S610, or when it is determined that the designation of the extraction period is not received (S609: NO), the CPU 11 calculates the total amount of usage from each print count of the extracted print log record (S611). Further, the CPU 11 generates usage data for display based on the calculated usage, and displays the generated usage data on the user IF 15 (S612). The amount of usage data is an example of output data, and S612 is an example of output process.

The amount of usage is information that indicates, for example, the total number of prints for each printer, the total number of prints for all printers, the cost value obtained by multiplying the number of prints for each printer by a cost coefficient, and the total cost, which is the sum of the costs for all printers. When the designation of a printer or a period of time is not received, the CPU 11 may calculate the amount of usage for each printer or each particular period of time, or only the total amount of usage for all printers or all periods of time.

Figures 15A, 15B:
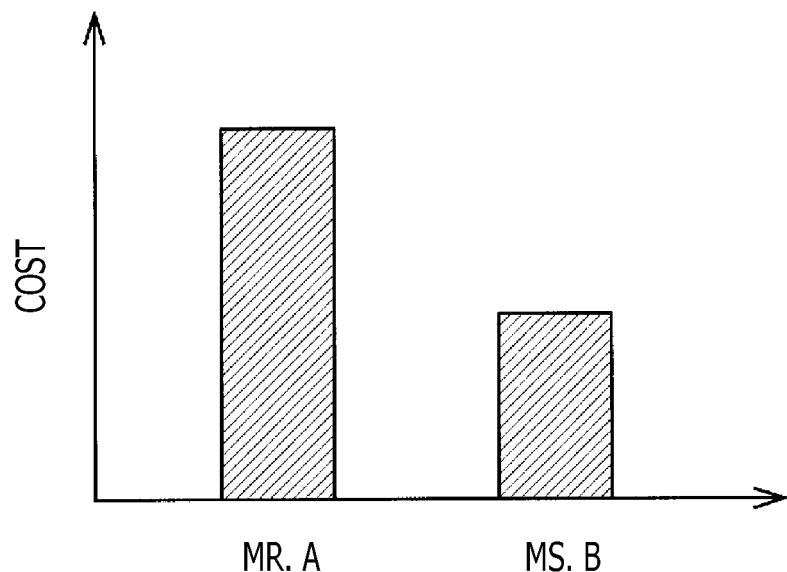
FIGS. 15A and 15B illustrate examples of output of used amount data.

In S612, the CPU 11 displays, for example, the total cost by the user of the specified user name or group name in a graph. The CPU 11 may display the cost value for each printer of the designated user. When multiple user names are specified, the CPU 11 displays the total cost for each user name in a graph, for example, as shown in FIG. 15A. When the designation of the printer is received, the CPU 11 displays the total cost for each user of the printer in a graph, for example. When neither the designation of the user name nor the group name nor the specification of the printer is received, the CPU 11 displays, for example, the total cost per printer in a graph.

After displaying the usage data in S612, the CPU 11 determines whether an instruction to change the mode of display is received (S613). On the screen for displaying the usage data, various buttons are displayed along with the graph to receive, for example, instructions for an output target, a printer designation, a period designation, an instruction to change the number of prints/cost, and an instruction to change a graph/table.

When it is determined that the instruction to change the display is received (S613: YES), the CPU 11 generates the usage data in a changed mode according to the received instruction and displays the same on the user IF 15 (S614). For example, when the CPU 11 receives the instruction to change the output target, printer, or period, the CPU 11 performs the same process as in S602 to S611 to display the changed usage data in a graph. The CPU 11 performs the same process as in S611 to display the usage data after the change in a graph. For example, when the instruction to change the number of prints/cost is received, the CPU 11 displays a graph showing the number of prints (e.g., the number of sheets of paper printed) instead of the total cost.

When the instruction to change the graph/table is received, the CPU 11 displays the usage data as a table, for example, as shown in FIG. 15B. FIG. 15B is an example of displaying the number of prints per printer and its cost value, the total number of sheets, and total cost for the designated user. The cost value for each printer is a value calculated using the cost coefficient for each printer.

That is, the mode of displaying the usage data to be displayed may be defined in advance by the printer management application 41 or may be selectable by the administrator. The information indicating the display mode may be, for example, a user name, and the user name in this example is an example of output mode information. The information indicating the mode of the display may be, for example, the cost coefficient. In this case, the CPU 11 calculates the amount of usage using the cost coefficient and generates usage data for display based on the calculated amount of usage. The cost coefficient is an example of output mode information.

It is noted that the CPU 11 may display the user whose total cost exceeds the cost threshold and is restricting printing by distinguishing the user from other users. The CPU 11 may, for example, display a message or mark indicating that printing is being restricted, or change the color of the graph. In addition, instead of displaying the usage data based on the calculated usage on the user IF 15, the CPU 11 may cause a printer or the like to print the same, or generate an e-mail and transmit the same to another device.

After execution of S614, or when it is determined that the instruction for display change has not been received (S613: NO), the CPU 11 determines whether the instruction for display completion has been received (S615). When it is determined that the instruction for display completion has not been received (S615: NO), the CPU 11 returns to S613 and waits until the instruction for display change or the instruction for display completion is received. When it is determined that the display completion instruction is received (S615: YES), the CPU 11 terminates the management information output process and returns to the printer management process of FIG. 2.

Returning to the description of the printer management process in FIG. 2, when it is determined that the instruction to output the management information is not received (S109: NO), the CPU 11 determines whether the instruction to update the log is received (S111). When it is determined that the instruction to update the log has been received (S111: YES), the CPU 11 executes the log update process described above (S112) and further executes the print restriction process (S113). In addition, when the periodic log update timing is reached, the CPU 11 also makes an affirmative determination in S111 (S111: YES) and executes S112 and S113.

After execution of the processes of S104, S106, S108, S110, and S113, or when it is determined that the instruction to update the log is not received (S111: NO), the CPU 11 determines whether the termination instruction of the printer management application 41 is received (S114). When it is determined that the termination instruction has not been received (S114: NO), the CPU 11 returns to S103 to receive various instructions. When it is determined that the termination instructions have been received (S114: YES), the CPU 11 terminates the printer management process.

As described above, by executing the printer management application 41 according to the present embodiment, the PC 1 identifies the user ID 421 based on the user registration DB 42, and among the plurality of print log records generated by each of the printers 2-6, the number of prints 455 is extracted from the plurality of print log records generated by each of the printers 2-6 that include the identified user ID 421. Further, the PC 1 generates usage data based on the user name or the cost coefficient referring to the information of the extracted number of prints 455, and outputs the generated usage data. According to the configuration according to the present embodiment, each of the printers 2-6 only needs to generate a print log record that includes, at a minimum, information on the user ID and the number of prints, and there is no need to perform the extraction process for management or to generate usage data for output, nor is there any need to keep the extraction results. Therefore, the memory load and processing load of each of the printers 2-6 are reduced. Furthermore, since each printer does not need to have advanced functions, there is a wide degree of freedom in the selection of printers to be employed in the printing system 100.

In addition, in the present embodiment, since the user name 422 is stored in the user registration DB 42 in association with the user ID 421, data categorized by the user name 422, for example, can be generated as usage data for output. Therefore, categorization for output can be easily performed by the PC 1. In addition, even if one user uses multiple user IDs, data indicating a print amount for one user can be output by grouping the multiple user IDs together as user name 422. Accordingly, each printer does not need to keep the user name information.

In the present embodiment, since the user ID of each user included in the group is stored in the group registration DB 43 in association with the group name 432 as the in-group user ID 433, the data categorized by the group name 432 can be generated as the usage data to be output. In particular, since the designation of the group name is also received in the user registration process and the user ID 421 in the user registration DB 42 is registered as the in-group user ID 433 for that group, the grouping work of the administrator is easy. Further, by outputting the amount of usage for each group, the output information becomes easier to use. The printer does not need to keep the information of the group and does not need to perform grouping.

In the present embodiment, each of the printers 2-6 transmits the print log record to the file server 9, which is the designated storage location, so the PC 1 does not need to access the printers 2-6 when collecting the print log record, and can collect the print log 51 even if printers 2-6 are not running. In addition, since the PC 1 stores a log storage location 444 for each printer in the printer registration DB 44, there is no need to inquire the printer about the log storage location, which facilitates the collection of the print log. In addition, the PC 1 can transmit the information designating the storage location to each printer and set the storage location to each printer, which eliminates the need for the administrator to move to each printer for setting and facilitates the initial work by the administrator.

In the present embodiment, the printer registration DB 44 includes the information of the cost coefficient 446, and the usage data based on the information of the cost coefficient 446 can be generated and output, so that the information reflecting the value of individual printing can be output. Each printer does not need to keep the information of the cost coefficient. The cost coefficient may be a value for each printer model, a value based on the printing capability, or a value based on the location of the printer. Since the cost of printing varies depending on the model and capability of the printer, the cost coefficient can be used to generate more suitable usage data.

In the present embodiment, the basic coefficients according to the model, capability, print media information, and the like of the printer are stored in the coefficient information DB 46. For example, for a printer that has not been registered in the printer registration DB 44, the input of information on the model and capability of the printer is received. Then, either the basic coefficients are automatically obtained based on the input printer information and used as cost coefficients, or editing of the obtained basic coefficients is received and the edited values are used as cost coefficients. Therefore, the operation of the administrator to set the cost coefficients is easy.

The above-described embodiment is merely an example and does not limit aspects of the present disclosures in any way. Therefore, the technology disclosed herein can naturally be improved and modified in various ways within aspects of the present disclosures but not deviating therefrom. For example, each printer connected to the PC 1 is not necessarily limited to a single-function device that only performs printing, but may be a copier, a multifunction machine, a facsimile machine, or any other device that has printing functions.

In the above-described embodiment, it is assumed that the printers 2-6 are all configured to transmit the print log records to the same file server 9, but they may also transmit the print log records to different storage locations, respectively. For example, the printers 2-6 may be configured to respectively transmit the print log records to different file servers designated by the PC 1.

The various DBs 42-47 used by the printer management application 41 are not necessarily limited to be stored in the non-volatile memory 14, and may be stored in an external device accessible from the PC 1. In addition, in the embodiment, the print log records of each of the printers 2-6 are collectively stored in the log information DB 45, but such a configuration is only an example and the print log records of each of the printers 2-6 may be stored in an individual DB for each printer.

In the above-described embodiment, it is assumed that the user ID of which user name is not designated is registered in the user registration DB 42 as a guest user, but such a user ID does not have to be registered. In other words, only users whose user ID and user name are both specified may be registered in the user registration DB 42.

In the above-described embodiment, the printer registration DB 44 is configured to include a record in which the log storage location 444 is stored for each printer ID 441, but the configuration of the printer registration DB 44 is not necessarily limited to such a configuration. When, for example, the printer ID is included in the print log record generated by each of the printers 2-6, the same log storage location 444 may be set for multiple printer IDs.

For example, the cost threshold 472 may be the same for all users, in which case the user registration DB 42 does not have to contain the information of the cost threshold 472. Further, the limitation period 473 may be the same for all users, in which case the user registration DB 42 does not have to contain the information of the limitation period 473.

The log information DB 45 does not have to be stored in the non-volatile memory 14. For example, in response to the startup of the printer management application 41, the CPU 11 may store the print log 51, which is obtained from the file server 9, in the RAM 13 and execute each process.

In the printer registration process, the cost coefficients are determined by accepting edits to the basic coefficients based on the information about the printer, but such a configuration is only an example and may be modified. For example, editing may not be accepted. Further, it is also possible to receive the input of the cost coefficients themselves by the administrator. Furthermore, instead of having the coefficient information DB 46 in the non-volatile memory 14, the coefficient information DB 46 may be incorporated in the printer management application 41 or downloaded from an external device.

In addition, in any of the flowcharts disclosed in the embodiment, a plurality of processes in arbitrary multiple steps can be executed in a different order, or can be executed in parallel, as far as there is no inconsistency in the processing content.

The processes disclosed in the embodiment may be executed by a single CPU, multiple CPUs, hardware such as an ASIC, or a combination thereof. In addition, the processes disclosed in the embodiment may be realized in various forms, such as a non-transitory recording medium in which computer-executable instructions realizing a program for performing the processes is recorded, or a method.

What is claimed is:

1. A non-transitory computer-readable recording medium for an information processing device having a computer, the recording medium containing computer-executable instructions which cause, when executed by the computer of the information processing device, the information processing device to perform:

collecting a plurality of print logs respectively generated by a plurality of printers, each of the plurality of print logs containing print amount information and first category information, the print amount information indicating an amount of printing, the first category information indicating a category of the print amount information;

identifying a category represented by the first category information by referring to a first database in which the first category information is registered;

extracting the print amount information of which category is indicated by identified first category information from the plurality of print logs collected in the collecting, the identified first category information being the first category information identified in the identifying; and generating output data based on the print amount information extracted in the extracting, the output data being based on output mode information; and outputting the output data through an output interface of the information processing device.

2. The recording medium according to claim 1, wherein the output mode information includes second category information indicating a category different from the category indicated by the first category information, the first category information being registered in the first database in an association manner with the second category information, and wherein the output data generated in the generating is categorized based on the second category information associated with the first category information, and wherein, in the outputting, the generated output data is output through the output interface.

3. The recording medium according to claim 2, wherein the computer-executable instructions cause the information processing device to perform obtaining a user name used as the second category information from a source different from the plurality of print logs, the first category information being a user ID identifying a user, each of the plurality of print logs respectively generated by each of the plurality of printers including the print amount information and a print record, the print amount information indicating the amount of printing based on a print job when printing based on the print job in which the user ID is identified is performed, the print amount information and the user ID identified in the print job being associated in the print record, wherein, in the extracting, the print amount information is extracted from the plurality of print logs collected in the collecting, the print amount information indicating a category indicated by the user ID, the user ID read out from the first database being the identified first category information, and wherein, in the outputting, the output data based on the print amount information extracted in the extracting is output through the output interface, the output data being categorized by the user name associated with the user ID, which is the identified first category information, in the first database.

4. The recording medium according to claim 3, wherein, in the obtaining of the user name, the user name used as the second category information is obtained through a user interface of the information processing device, and wherein the computer-executable instructions cause the information processing device to perform registering the user name obtained in the obtaining of the user name in the first database the user name being registered in an association manner with the user ID included in at least one of the plurality of print logs.

5. The recording medium according to claim 4, wherein, in the obtaining of the user name:

the user ID included in at least one of the plurality of print logs collected in the collecting is extracted; and the user name corresponding the extracted user name is obtained by receiving through the user interface.

6. The recording medium according to claim 2, wherein, in the outputting:

based on a third database in which group information indicating a group is registered, the group to which the identified first category information belongs is identified, the group information indicating the group to which the plurality of pieces of the identified first category information belong; and the output data based on the identified group is generated; and the generated output data is output through the output interface.

7. The recording medium according to claim 6, wherein the computer-executable instructions cause the information processing device to perform:

receiving the second category information and the group through a user interface of the information processing device, the second category information being associated with the first category information in the first database; and registering information indicating the received group in the third database, the information being registered as the group information indicating a group to which the first category information belongs, the first category information being associated with the received second category information.

8. The recording medium according to claim 7, wherein the output mode information includes a unit value corresponding to each of the plurality of printers, the unit value being a unit value for the amount of printing indicated by the print amount information included in each of the print logs, and wherein, in the outputting, the output data is generated based on the unit value corresponding to a specific printer and the amount of printing indicated by the print amount information extracted in the extracting, and the generated output data is output through the output interface, the specific printer being a printer which generates the print log including the print amount information extracted in the extracting, among the plurality of print logs.

9. The recording medium according to claim 8, wherein the unit value is a value according to characteristic information of a printer, wherein the computer-executable instructions cause the information processing device to perform obtaining the characteristic information of at least one of the plurality of printers, and wherein, in the outputting, the output data is generated based on the unit value and an amount of printing, and the generated data is output through the output interface, the unit value being the value according to the characteristic information of the specific printer obtained by the information processing device, the amount of printing being indicated by the print amount information extracted in the extracting.

10. The recording medium according to claim 9, wherein, in the obtaining of the characteristic information, model identification information identifying a model of a printer is obtained as the characteristic information, and wherein, in the outputting, the output data is generated based on the unit value and an amount of printing, and the generated output data is output through the output interface, the unit value being according to the model identification information of the specific printer obtained by the information processing device, the amount of printing being indicated by the print amount information extracted in the extracting.

11. The recording medium according to claim 9, wherein, in the obtaining of the characteristic information, capability information of a printer is obtained as the characteristic information, and wherein, in the outputting, the output data is generated based on the unit value and an amount of printing, and the generated output data is output, the unit value being a value according to the characteristic information of the specific printer obtained in the obtaining of the characteristic information, the amount of printing being indicated by the print amount information extracted in the extracting.

12. The recording medium according to claim 9, wherein, in the obtaining of the characteristic information, at least one of model identification information and capability information as the characteristic information, the model identification information indicating a model of a printer, the capability information indicating capability of a printer, wherein the computer-executable instructions cause the information processing device to perform:

reading out an initial unit value from a fourth database in which the at least one of the model identification information and the capability information and the initial unit value are associated with each other, the initial unit value being an initial value of a unit value based on the characteristic information obtained in the obtaining of the characteristic information;

receiving an operation of editing the initial unit value through a user interface of the information processing device; and registering the initial unit value edited by the received operation to a fifth database as the unit value corresponding to a printer subject to obtaining of the characteristic information by the information processing device, and wherein, in the outputting, the unit value corresponding to the specific printer is read out from the fifth database, the output data is generated based on the read unit value and an amount of printing indicated by the print amount information extracted in the extracting, and the generated output data is output through the output interface.

13. The recording medium according to claim 12, wherein, in the obtaining of the characteristic information, at least one of printer identification information, the model identification information and the ability information is received through the user interface as unit value category information, the printer identification information indicating a printer subject to the registering of the unit value, wherein, in the registering of the unit value, the unit value and the printer identification information are registered to the fifth database in an association manner, the printer identification information being categorized by the unit value category information received in the obtaining of the characteristic information, and wherein, in the outputting, when a printer indicated by the printer identification information registered in the fifth database is the specific printer:

the unit value is read out from the fifth database, the unit value being registered in the fifth database in an association manner with the printer identification information indicating the specific printer;

the output data is generated based on the read unit value and an amount of printing indicated by the print amount information extracted in the extracting; and the generated output data is output through the output interface.

14. The recording medium according to claim 8, wherein the output mode information including second category information indicating a category different from a category indicated by the first category information, the first category information being registered in the first database in an association manner with the second category information, wherein the computer-executable instructions cause the information processing device to perform:

identifying the second category information using the first database;

extracting the print amount information of the print log indicated by specific second category information, the specific second category information being the second category information identified in the identifying;

calculating an evaluation value based on the extracted print amount information and the unit value; and transmitting a restriction command to the plurality of printers when the calculated evaluation value exceeds a threshold value, the restriction command being a command of restricting printing of a print job in which the first category information to be associated with the specific second category information on the first database is specified.

15. The recording medium according to claim 1, wherein destination information is set to each of the plurality of printers, the destination information indicating a storage area of an external device, each of the plurality of print logs being to be stored in the storage area, the plurality of printers being configured to store the plurality of print logs in the storage area indicated by the destination information, respectively, wherein the destination information corresponding to the plurality of printers is identified based on a second database, identification information of each of the plurality of printers and the destination information being associated in the second database, and wherein, in the collecting, the plurality of print logs generated by the plurality of printers, respectively, are collected from the storage area of the external device indicated by the destination information.

16. The recording medium according to claim 15, wherein the computer-executable instructions cause the information processing device to perform:

receiving the destination information of a target printer through a user interface of the information processing device, the target printer being a printer subject to collection of the printer log;

registering the destination information received in the receiving is the second database with the identification information of the target printer; and transmitting the destination information received in the receiving to the target printer, the target printer being configured to set the storage are of the external device indicated by the destination information as a storage destination of the print log, and transmit the print log to store the print log in the set storage area of the external device.

17. A management device comprising:

a computer; and an output interface, wherein the computer is configured to perform:

collecting a plurality of print logs respectively generated by a plurality of printers, each of the plurality of print logs containing print amount information and first category information, the print amount information indicating an amount of printing, the first category information indicating a category of the print amount information;

identifying a category represented by the first category information by referring to a first database in which the first category information is registered;

extracting the print amount information of which category is indicated by identified first category information from the plurality of print logs collected in the collecting, the identified first category information being the first category information identified in the identifying; and generating output data based on the print amount information extracted in the extracting, the output data being based on output mode information; and outputting the generated output data through the output interface.

18. A printing system comprising a plurality of printers and a management device, wherein each of the plurality of printers is configured to perform:

receiving a print job with first category information;

executing printing based on the print job; and generating a print log according to the executed printing, the print log including print amount information and first category information, the print amount information indicating an amount of the executed printing, the first category information indicating a category of the print amount information, and wherein the management device is configured to:

collecting a plurality of print logs respectively generated by the plurality of printers;

identifying a category represented by the first category information by referring to a first database in which the first category information is registered;

extracting the print amount information of which category is indicated by identified first category information from the plurality of print logs collected in the collecting, the identified first category information being the first category information identified in the identifying; and generating output data based on the print amount information extracted in the extracting, the output data being based on output mode information; and outputting the generated output data through an output interface of the management device.

19. The printing system according to claim 18, wherein each of the plurality of printers configured to store the generated print log in an external device, and wherein the management device is configured to collect the print log from the external device.

* * * * *